UNITED STATES PATENT OFFICE.

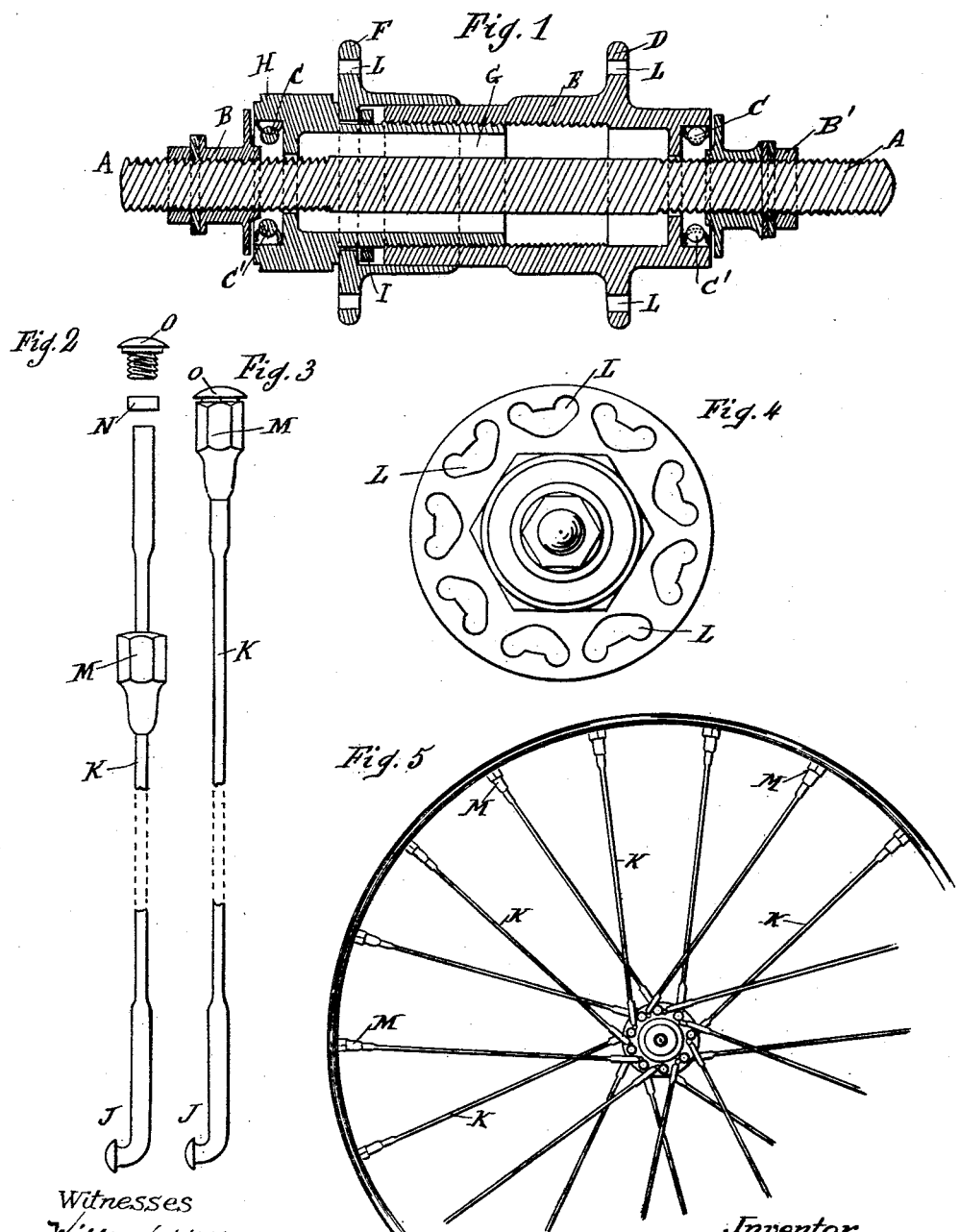

ELÉONORE MAZIER, OF PARIS, FRANCE.

HUB-STRETCHER.

SPECIFICATION forming part of Letters Patent No. 684,285, dated October 8, 1901.

Application filed July 2, 1901. Serial No. 66,867. (No model.)

*To all whom it may concern:*

Be it known that I, ELÉONORE MAZIER, a citizen of the French Republic, residing at Paris, France, have invented a new and Improved Hub-Stretcher, (for which I have obtained a French patent, No. 308,003, dated February 11, 1901,) of which the following is a specification.

The object of this invention is to give a uniform tension to the metallic spokes of motor road-vehicles, bicycles, and other vehicles by lessening or increasing the distance between the flanges of the hub, on which the lower extremities of the spokes are placed. This disposition has the further advantage of facilitating the partial setting and removal of the spokes and putting them in order at once, so that anybody can easily do this work.

In order that my invention may be more clearly understood, reference is made to the annexed drawings, in which—

Figure 1 is a sectional view of my hub-stretcher. Figs. 2 and 3 represent a spoke; Fig. 4, a separate view of a flange of the hub; and Fig. 5 shows the wheel, on a small scale, supplied with its spokes.

In all the figures the same letters of reference indicate corresponding parts.

A is a central axle like those of all ball-bearing wheels. The nuts B and B' and balls C C' are likewise introduced only to show how my hub-stretcher is placed; but those parts are in no wise different from those already known, and consequently do not constitute part of my invention.

My hub-stretcher is made of the following pieces:

D is a flange firmly fixed to the tube E, which is threaded on the inside. F is the opposite flange, turning freely on the tube G, threaded on the outside. This flange is held between the nut H and a steel ring I, fixed on the tube G.

H is a six-sided nut actuating the tube G.

The tubes E and G have a male and female thread, respectively, so that by screwing one into the other by means of the nut H, which is moved by a screw-key, the cheeks D and F are brought nearer, and by unscrewing they are separated from each other, thereby producing a tension. My system of tension is entirely based on this disposition, and I mount the spokes on the wheels as follows: I bring the flange D nearer to the flange F by screwing the two tubes into each other. Then I put the head J of the spoke K into a hole L of the flange D. I introduce the other extremity of the spoke into a cylindroconic nut M, of copper or other metal, which slides freely along the spokes. Then I solder a little stop N on the extremity of the spoke, thus preventing the nut M from coming out of the spoke again. This little stop is soldered, so as to give the same length to all the spokes, and it rests inside the nut M on the bottom. The nut M is then brought up to one of the holes formed in the rim corresponding to the hole in the flange D. Then into this hole of the rim, at the side of the groove, is introduced a convex-headed bolt O, which screws into the inside threaded part of the nut M. Everything is tightened at the same time, and in this way the spoke is held in its place. As may be seen, the nut M has sides which give a grip to a key-screw. This disposition has the further advantage of allowing the spokes to be set in and taken out without removing the tires afterward. The setting of the other spokes is effected in the same way, care being taken to properly choose the holes in the rim and the holes in the flange, which must correspond, as usual. When all the spokes are set in, they are uniformly stretched by increasing the distance between the flanges D and F by unscrewing the two tubes E G with a screw-key which acts on the nut H. The movement of separation is stopped when the tension of the spokes is sufficient.

What I claim is—

1. A hub-stretcher for spokes of wheels of bicycles, motor road-vehicles or other wheels with tension-spokes, consisting of a tube provided with exterior male threads, a second tube provided with interior female threads engaging the male threads of the first-mentioned tube, a rigid flange provided upon one of the aforesaid tubes, and a longitudinally-movable flange parallel with the first-mentioned flange, substantially as described.

2. A hub-stretcher for spokes of wheels of bicycles, motor road-vehicles or other wheels with tension-spokes, consisting of a tube provided with exterior male threads, a second tube provided with interior female threads engaging the male threads of the first-mentioned tube, a rigid flange provided upon the said second tube, and a second flange parallel with the first-mentioned flange and longitudinally movable upon the said second tube, substantially as described.

3. A hub-stretcher for spokes of wheels of bicycles, motor road-vehicles or other wheels with tension-spokes, consisting of a tube provided with exterior male threads, a second tube provided with interior female threads engaging the male threads of the first-mentioned tube, a rigid flange provided upon the said second tube, and a second flange mounted upon the first-mentioned tube and longitudinally movable upon the said second tube, the said first-mentioned tube provided with means for preventing any movement other than rotary between the second-named flange and the first-mentioned tube, substantially as described.

4. A hub-stretcher for spokes of wheels of bicycles, motor road-vehicles or other wheels with tension-spokes consisting of a flange D attached to a tube E, threaded on the inside and an opposite flange F turning freely (on a tube G, threaded on the outside) between a nut H and a steel ring I fixed on the said tube G the whole working on the axle of the wheel and serving to increase or lessen the distance between the flanges D and F so as to respectively stretch or slacken the spokes of the wheel substantially as above described.

In testimony whereof I have signed my name to this specification in the presence of two subscribing witnesses.

ELÉONORE MAZIER.

Witnesses:
G. LOMBARD CONNEVILLE,
RENÉ DEFONTENAY.